US012601432B2

(12) United States Patent
Tseng et al.

(10) Patent No.: US 12,601,432 B2
(45) Date of Patent: Apr. 14, 2026

(54) FLOATING CONNECTOR FOR LIQUID COOLING DEVICE

(71) Applicant: HANWIT PRECISION INDUSTRIES LTD., New Taipei (TW)

(72) Inventors: Ying-Chih Tseng, New Taipei (TW); Ming-De Wu, New Taipei (TW); Ching-Kai Chang, New Taipei (TW)

(73) Assignee: HANWIT PRECISION INDUSTRIES LTD., New Taipei City (TW)

( * ) Notice: Subject to any disclaimer, the term of this patent is extended or adjusted under 35 U.S.C. 154(b) by 0 days.

(21) Appl. No.: 18/937,251

(22) Filed: Nov. 5, 2024

(65) Prior Publication Data

US 2025/0224053 A1      Jul. 10, 2025

Related U.S. Application Data

(63) Continuation-in-part of application No. 18/784,236, filed on Jul. 25, 2024.

(30) Foreign Application Priority Data

Jan. 5, 2024     (TW) ................................. 113100608

(51) Int. Cl.
| | |
|---|---|
| *F16L 27/08* | (2006.01) |
| *F16L 27/10* | (2006.01) |
| *F16L 27/12* | (2006.01) |

(52) U.S. Cl.
CPC ........... *F16L 27/08* (2013.01); *F16L 27/1021* (2013.01); *F16L 27/125* (2013.01)

(58) Field of Classification Search
CPC ....... F16L 27/00; F16L 27/08; F16L 27/0824; F16L 27/10; F16L 27/1008;
(Continued)

(56) References Cited

U.S. PATENT DOCUMENTS

| | | | | | |
|---|---|---|---|---|---|
| 1,489,277 | A | * | 4/1924 | Rains | ...................... F16L 39/04 |
| | | | | | 285/94 |
| 2,175,752 | A | * | 10/1939 | Gray | ....................... F16L 27/00 |
| | | | | | 285/94 |

(Continued)

FOREIGN PATENT DOCUMENTS

| | | | | | |
|---|---|---|---|---|---|
| EP | | 1632705 A1 | * | 3/2006 | ......... F16L 27/0824 |
| GB | | 2297000 A | * | 7/1996 | .............. F16L 27/08 |

(Continued)

*Primary Examiner* — Matthew Troutman
*Assistant Examiner* — Fannie Kee
(74) *Attorney, Agent, or Firm* — Muncy, Geissler, Olds & Lowe, P.C.

(57) ABSTRACT

A floating connector for liquid cooling device includes a housing having an accommodating and adjusting space inside, an opening at the front side, a perforation at the rear side and an inclined inner wall therein adjacent to the opening; and a floating module including a connector having a docking portion positioned in the opening, a positioning portion positioned in the perforation, a base in the middle, a liquid flow channel extending through the docking portion, the base and the positioning portion and an inclined ring portion formed between the base and the docking portion, and an elastic member with two ends thereof respectively abutting the base and the housing mounted around the positioning portion, so that when the elastic member is in an extended state, the inclined ring portion is supported against the inclined inner wall.

9 Claims, 6 Drawing Sheets

(58) Field of Classification Search

CPC ..... F16L 27/1021; F16L 27/12; F16L 27/125; F16L 33/225; F16L 39/04; F16L 41/005; F16L 41/007; F16L 49/08

See application file for complete search history.

(56) References Cited

U.S. PATENT DOCUMENTS

| | | | | |
|---|---|---|---|---|
| 3,446,245 A * | 5/1969 | Snyder, Jr. | .......... | F16L 27/0824 285/276 |
| 4,254,972 A * | 3/1981 | Wiedenbeck | .......... | F16L 39/04 285/422 |
| 6,454,313 B1 * | 9/2002 | Dawson, Jr. | .......... | F16L 27/08 285/334.3 |
| 9,383,046 B2 * | 7/2016 | Pearl, II | .......... | F16L 27/08 |
| 2010/0132178 A1 * | 6/2010 | Chiu | .......... | F16L 27/08 29/281.5 |
| 2010/0232908 A1 * | 9/2010 | Chiu | .......... | F16L 27/08 411/554 |
| 2012/0099943 A1 * | 4/2012 | Chiu | .......... | F16L 27/08 411/347 |
| 2012/0195711 A1 * | 8/2012 | Chiu | .......... | F16L 27/08 411/103 |
| 2013/0170895 A1 * | 7/2013 | Tseng | .......... | F16L 27/08 403/270 |
| 2013/0294863 A1 * | 11/2013 | Tseng | .......... | F16L 27/08 411/175 |
| 2014/0105707 A1 * | 4/2014 | Tseng | .......... | F16L 27/08 411/508 |
| 2015/0071730 A1 * | 3/2015 | Tseng | .......... | F16L 27/08 411/318 |
| 2023/0143344 A1 * | 5/2023 | Marquis | .......... | F16L 27/08 285/261 |
| 2024/0077160 A1 * | 3/2024 | Zhang | .......... | F16L 39/04 |

FOREIGN PATENT DOCUMENTS

| | | | | | |
|---|---|---|---|---|---|
| KR | 200325938 Y1 * | 9/2003 | .............. | F16L 27/08 |
| TW | I866775 B * | 12/2024 | .............. | F16L 27/12 |
| WO | WO-0136857 A2 * | 5/2001 | .............. | F16L 27/125 |

* cited by examiner

FLOATING CONNECTOR FOR LIQUID COOLING DEVICE

CROSS REFERENCE TO THE RELATED APPLICATIONS

This application is a Continuation-In-Part of application Ser. No. 18/784,236, filed on Jul. 25, 2024, for which priority is claimed under 35 U.S.C. § 120, the entire contents of which are hereby incorporated by reference.

This application claims the priority benefit of Taiwan patent application number 113100608, filed on Jan. 5, 2024.

BACKGROUND OF THE INVENTION

1. Field of the Invention

The present invention provides a floating connector for liquid cooling device, and more particularly, when the connector of the floating module is moved toward the perforation at the rear side to compress the elastic member, the inclined ring portion and the inclined inner wall are in a non-contact state, and the docking portion of the connector has a ring-shaped offset when engaged with the preset inter-matching connector and has a skew correction function. If there is a problem with a small size tolerance when the preset inter-matching connector and the connector of the floating module are connected, the connector of the floating module can still be connected at a slightly tilted angle to ensure the tight fit between these two without causing water coolant leakage. Since the components of the floating connector are extremely simple, it has the effect of effectively reducing the overall size, which is conducive to the layout of electronic devices in limited internal space.

2. Description of the Related Art

According to the current electronic devices, when the housing, circuit board or panels (board to board) are assembled, they are locked with a set screw with a knob, a ring and a screw. The screw and the ring can be fixed on the first panel, then turn the knob to lock the screw into the second panel to form a preset position, and use a hand tool to tighten the screw to lock the first panel and the second panel into one piece. It can be used for board-to-board connection in equipment composed of multiple devices and mechanisms, such as telecommunications cabinets, industrial computers, and machine tools.

When various electronic devices are used, the lost electrical energy is converted into heat energy. Therefore, heat dissipation is an important issue in the design and application of various electronic devices so that various electronic devices can operate normally. Currently, the water cooling system commonly used in various electronic devices for heat dissipation is to install the water cooling device (such as the cold plate) of the water cooling system on the heat source of various electronic devices (such as central processing unit (CPU), chip, microcontroller unit (MCU) or interface card, etc.). Then use water pipes to connect to the external heat dissipation mechanism (such as water cooling radiator), and the heat source can be dissipated through the water cooling system. However, the connectors of the water cooling device are connected to the connectors of the water pipes for assembly so that the water coolant in the water pipes can circulate into the water cooling device. However, the connectors of the water cooling device are directly fixed in the housing, circuit board or panels of various electronic devices and cannot be adjusted or moved. Therefore, when assembling the water pipes, it must be accurately aligned without any deviation or skew. If the water pipes are slightly longer or shorter due to tolerance issues, or if other components installed around the heat source limit or block the water pipes, making it impossible to lay out the water pipes in the shortest possible path, it will make the assembly of the water cooling device and the water pipes difficult. If the connection mechanism is assembled with rigid force, it may be damaged or fail.

Therefore, how to solve the problem of increasing the difficulty of assembly and alignment when assembling the water cooling device in the housing or heat source of the current electronic device, and the trouble and defects such as damage or failure easily caused by improper assembly, is the direction that the relevant manufacturers engaged in this industry are eager to study and improve.

SUMMARY OF THE INVENTION

Therefore, in view of the above-mentioned problems and deficiencies, the inventor collected relevant information, and after multiple evaluations and considerations, he designed the invention of this floating connector for liquid cooling device.

The main object of the present invention is to provide a floating connector for liquid cooling device, which comprises a housing and a floating module. The housing comprises an accommodating and adjusting space therein, an opening formed at a front side of the accommodating and adjusting space, a perforation formed at an opposing rear side of the accommodating and adjusting space, and an inclined inner wall formed in the accommodating and adjusting space adjacent to the opening. The floating module is disposed in the accommodating and adjusting space. The floating module comprises a connector and an elastic member. The connector comprises a base located in the middle, a docking portion formed at a front end of the base and positioned in the opening, a positioning portion formed at an opposing rear end of the base and positioned in the perforation, a liquid flow channel extending through the docking portion, the base and the positioning portion, and an inclined ring portion formed between the base and the docking portion around the liquid flow channel. The elastic member with two ends thereof respectively abutting against the base and the housing is mounted around the positioning portion, so that when the elastic member is in an extended state, the inclined ring portion is supported against the inclined inner wall, and when the connector is pushed toward the perforation at the rear side of the accommodating and adjusting space to compress the elastic member, the inclined ring portion and the inclined inner wall are in a non-contact state, and the docking portion of the connector has a ring-shaped offset when engaged with a preset inter-matching connector and has a skew correction function. If there is a problem with a small size tolerance when the preset inter-matching connector and the connector of the floating module are connected, the connector of the floating module can still be connected at a slightly tilted angle to ensure the tight fit between these two without causing water coolant leakage.

Another object of the present invention is that the housing is composed of a holder body and a baffle that are combined with each other. The holder body has the accommodating and adjusting space, the opening and the inclined inner wall therein. The baffle comprises a main body with the perforation disposed therein, and two side panels respectively bent from two sides thereof toward the same side. The holder body further comprises two recessed assembly portions respectively located on two opposite lateral sides thereof, and a plurality of fixing grooves located on each of the recessed assembly portions. The baffle is further provided with a plurality of through holes at the two side panels corresponding to the fixing grooves, and a plurality of fasteners composed of screws inserted into the through holes and locked into the fixing grooves to form a fixing structure of the holder body and the baffle.

Still another object of the present invention is that the base of the connector has an outer diameter larger than the docking portion and the positioning portion; the docking portion of the connector comprises at least one flat and cut operating surface located on an outer side thereof for disassembly and assembly by a preset hand tool, and an internal thread located on an inner wall thereof for a preset inter-matching connector to be screwed in and fixed.

Still another object of the present invention is that the positioning portion of the connector comprises an annular groove disposed at the end thereof extending out of the housing, an internal thread located on an inner wall thereof for another preset inter-matching connector to be screwed in and fixed, and a stopper selectively composed of a C-shaped buckle ring or a gasket and set in the annular groove.

DETAILED DESCRIPTION OF THE PREFERRED EMBODIMENT

Figure 1:
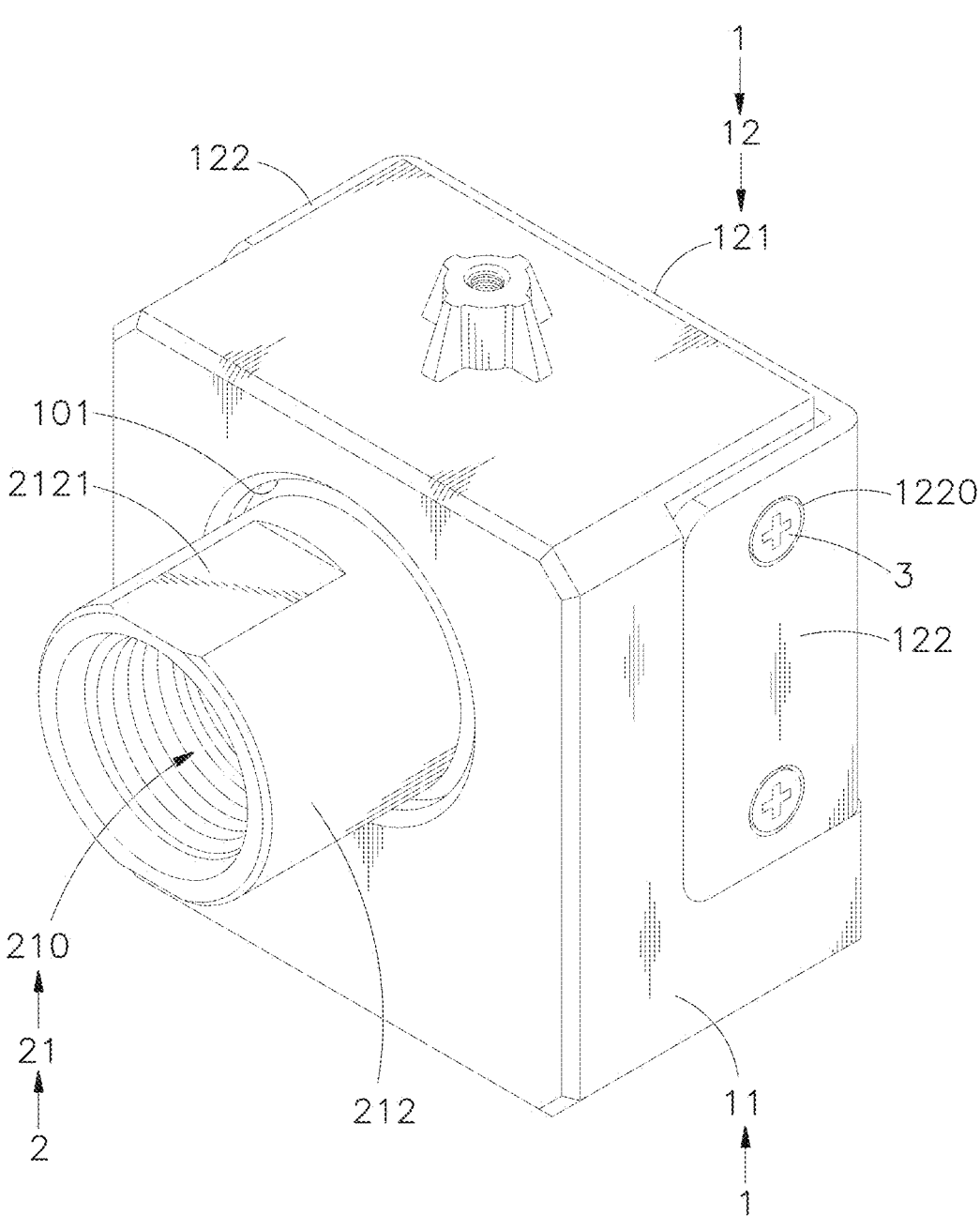
FIG. 1 is a three-dimensional external view of the floating connector of the present invention.
Figure 2:
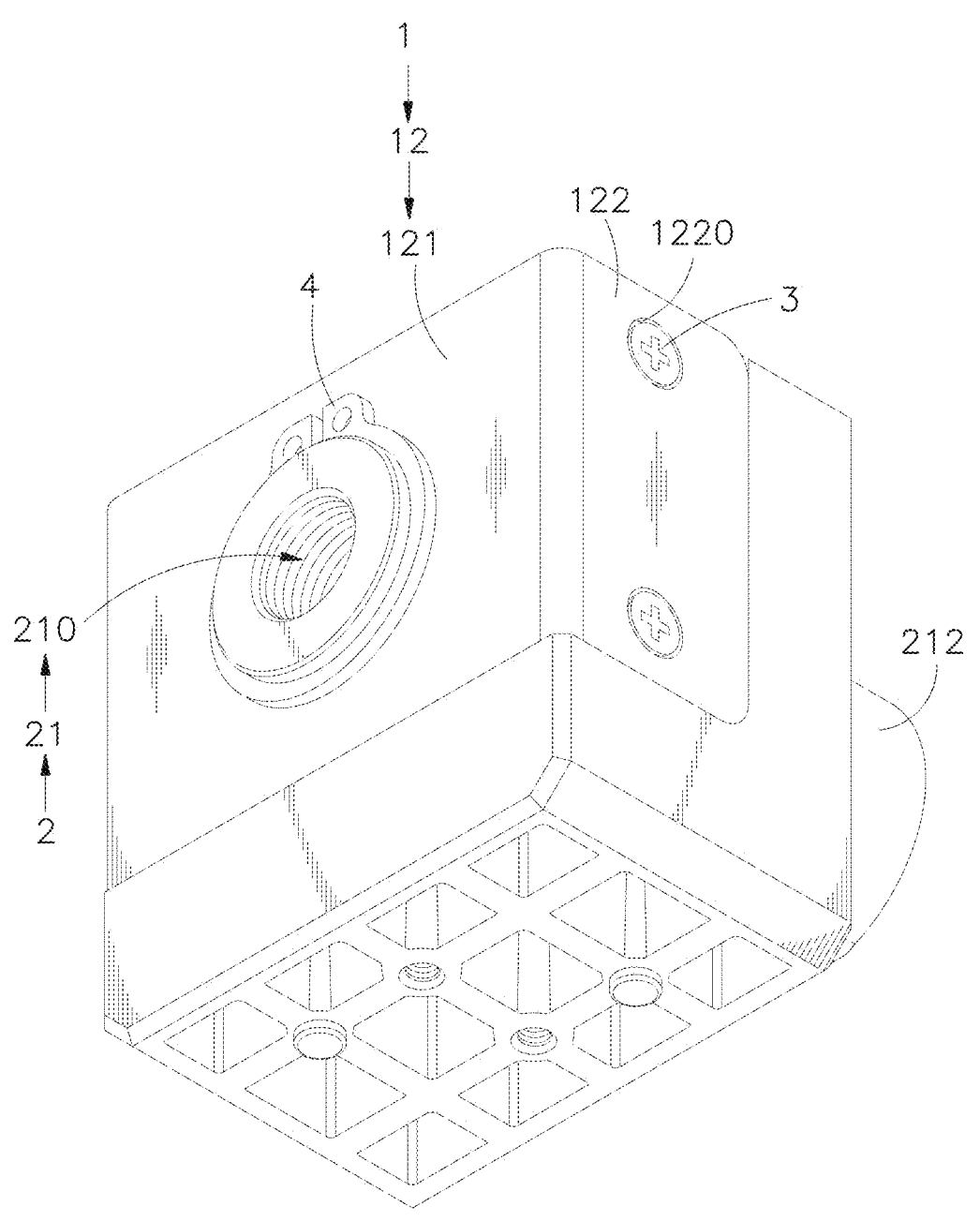
FIG. 2 is a three-dimensional external view of the floating connector of the present invention from another perspective.
Figure 3:
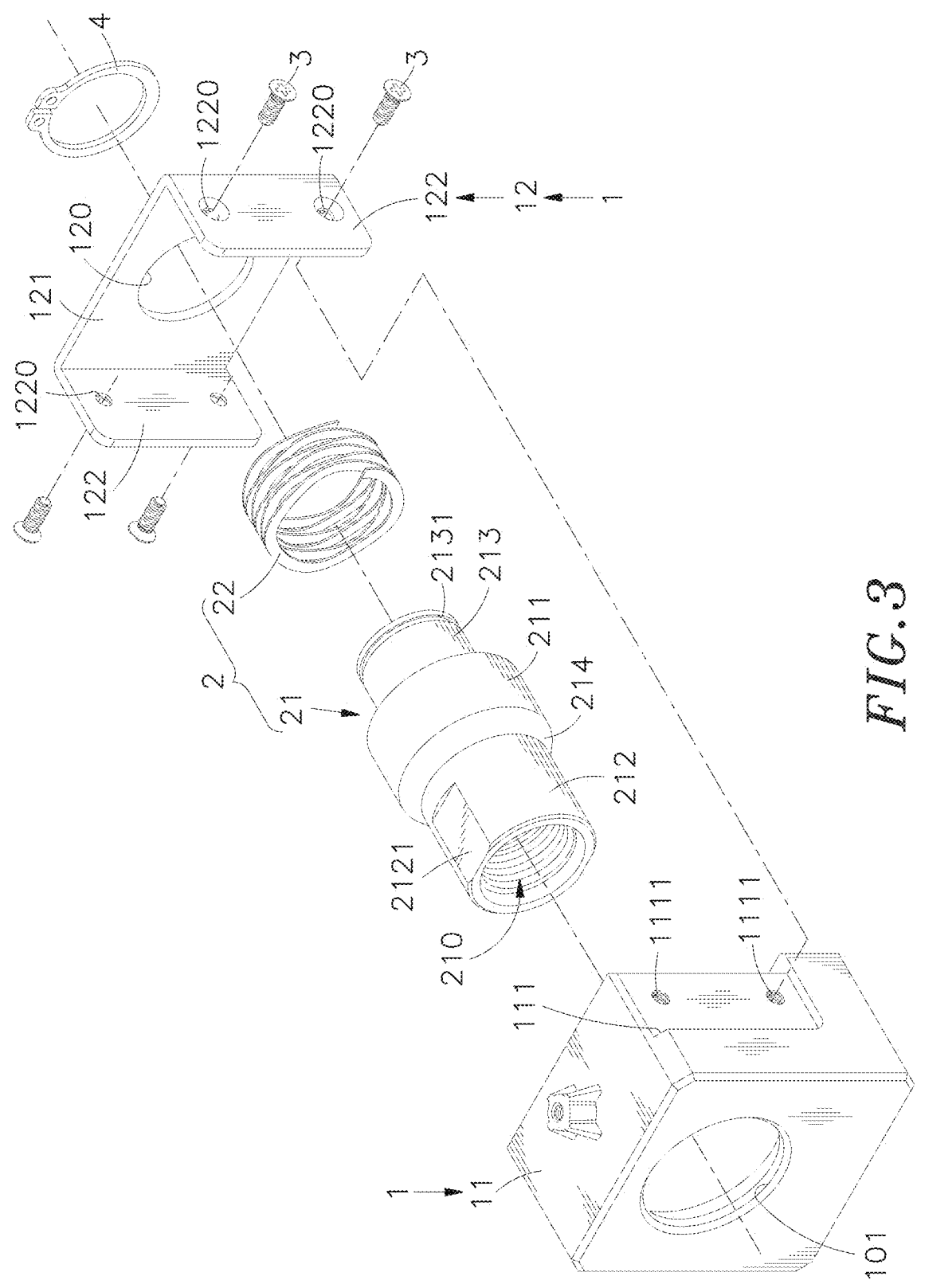
FIG. 3 is a three-dimensional exploded view of the floating connector of the present invention.
Figure 4:
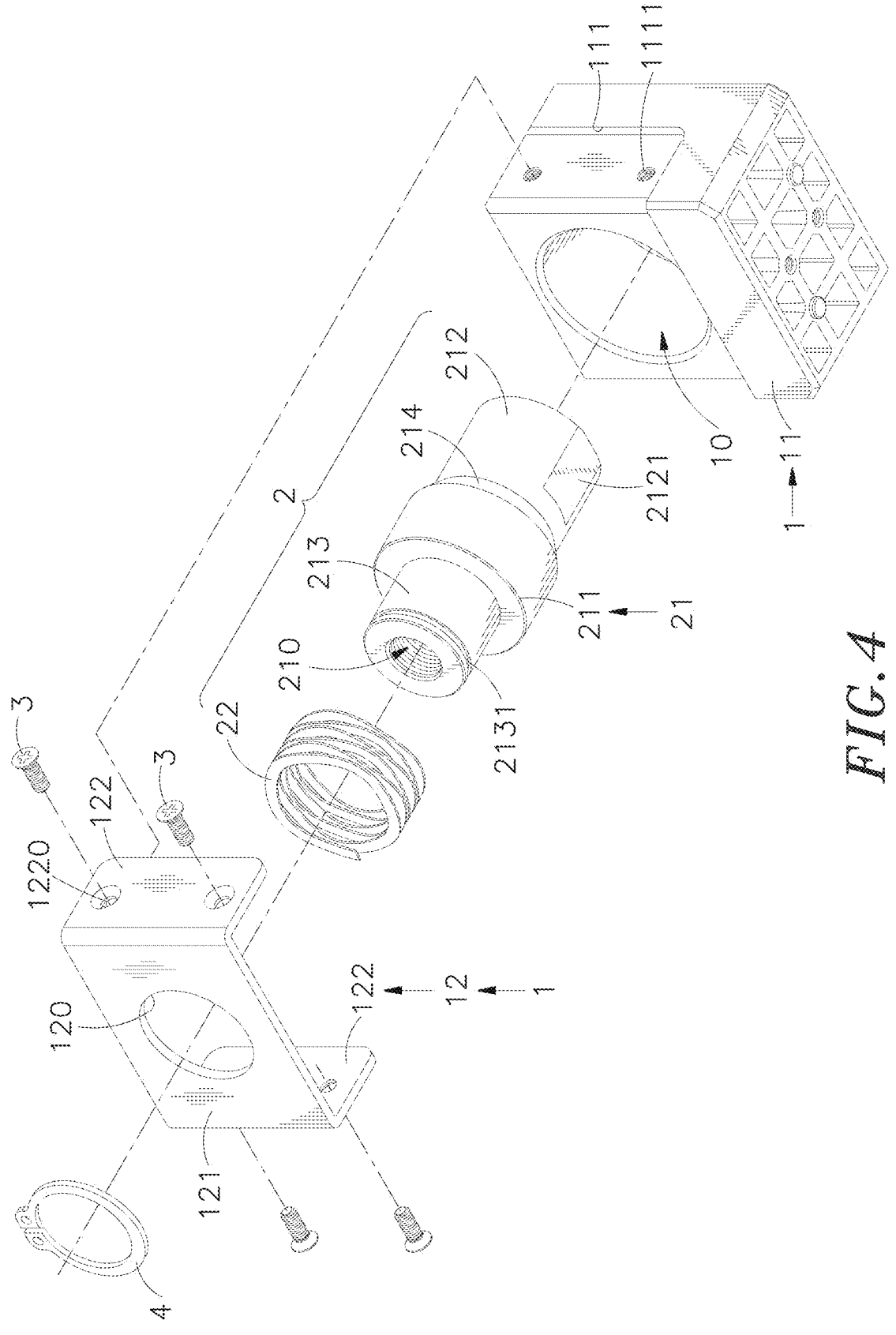
FIG. 4 is a three-dimensional exploded view of the floating connector of the present invention from another perspective.
Figure 5:
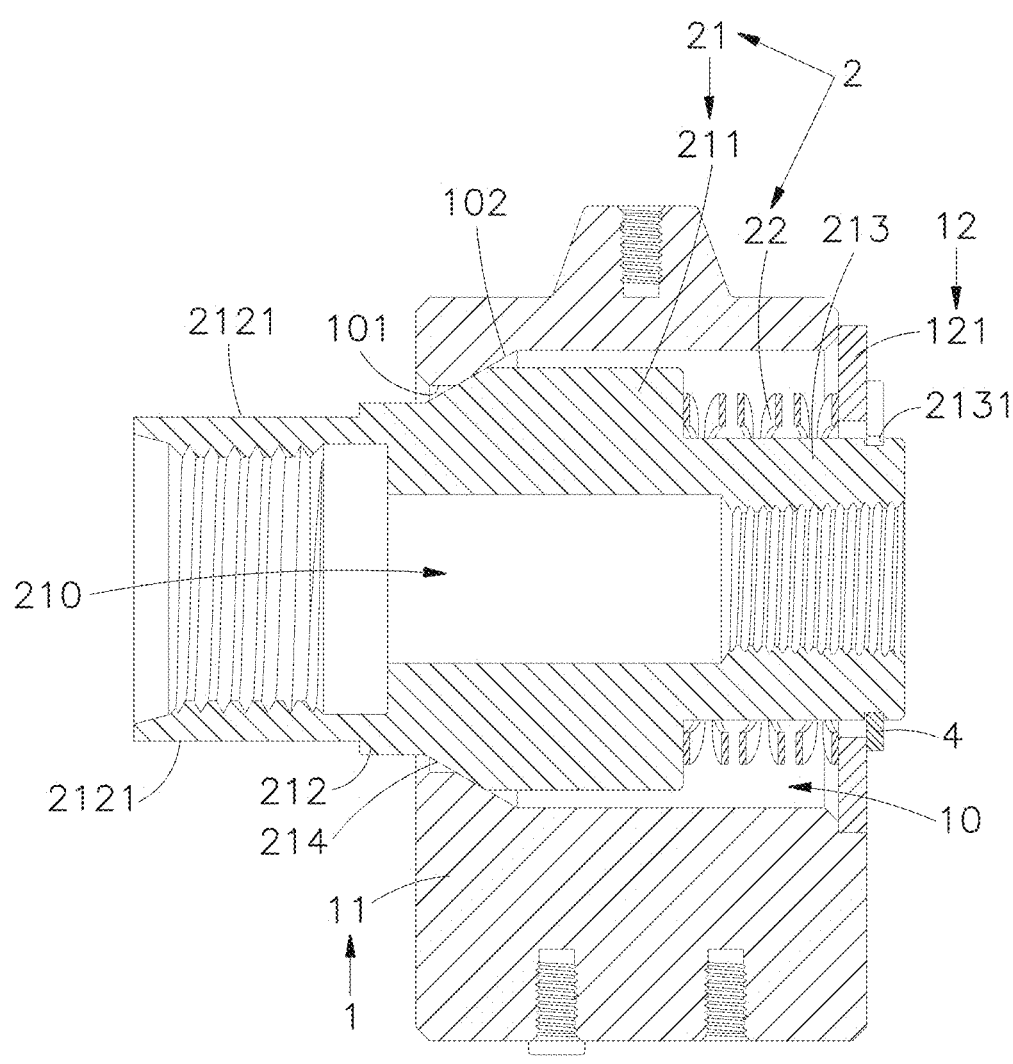
FIG. 5 is a side cross-sectional view of the floating connector of the present invention when the elastic member is in the extended state.

In order to achieve the above objects and effects, the technical means and structures adopted by the present invention are described in detail below by way of a preferred embodiment accompanying with the annexed drawings so as to facilitate a complete understanding.

Please refer to FIGS. 1-6, which are three-dimensional external view of the floating connector of the present invention, three-dimensional external view of the floating connector of the present invention from another perspective, three-dimensional exploded view of the floating connector of the present invention, three-dimensional exploded view of the floating connector of the present invention from another perspective, side cross-sectional view of the floating connector of the present invention when the elastic member is in the extended state and side cross-sectional view of the floating connector of the present invention when the elastic member is compressed. As can be clearly seen in the figures, the floating connector for liquid cooling device of the present invention mainly comprises a housing 1 and a floating module 2, and its main components and features are described in detail as follows:

The housing 1 comprises an accommodating and adjusting space 10 therein, an opening 101 formed at a front side of the accommodating and adjusting space 10, a perforation 120 formed at an opposing rear side of the accommodating and adjusting space 10, and an inclined inner wall 102 formed in the accommodating and adjusting space 10 adjacent to the opening 101.

The floating module 2 is disposed in the accommodating and adjusting space 10. The floating module 2 comprises a connector 21 and an elastic member 22. The connector 21 comprises a base 211 located in the middle, a docking portion 212 formed at a front end of the base 211 and positioned in the opening 101, a positioning portion 213 formed at an opposing rear end of the base 211 and positioned in the perforation 120, and a liquid flow channel 210 extending through the docking portion 212, the base 211 and the positioning portion 213, and an inclined ring portion 214 formed between the base 211 and the docking portion 212 around the liquid flow channel 210. The elastic member 22 with two ends thereof respectively abutting against the base 211 and the housing 1 is mounted around the positioning portion 213, so that when the elastic member 22 is in the extended state, the inclined ring portion 214 is supported against the inclined inner wall 102. When the connector 21 is pushed toward the perforation 120 at the rear side of the accommodating and adjusting space 10 to compress the elastic member 22, the inclined ring portion 214 and the inclined inner wall 102 are in a non-contact state, and the docking portion 212 of the connector 21 has a ring-shaped offset when engaged with a preset inter-matching connector (not shown in the figures) and has a skew correction function.

The above-mentioned elastic member 22 composed of the flat spring with undulating winding can float in horizontal and vertical (X, Y) radial directions in the accommodating and adjusting space 10 of the housing 1. At the same time, the elastic member 22 can be used to float in the axial direction (Z) in the accommodating and adjusting space 10 of the housing 1.

The above-mentioned housing 1 is composed of a holder body 11 and a baffle 12 that are combined with each other. The accommodating and adjusting space 10, the opening 101 and the inclined inner wall 102 are formed in the holder body 11. The baffle 12 comprises a main body 121 in which the perforation 120 is disposed. Two sides of the main body 121 are bent toward the same side to form two side panels 122. The holder body 11 comprises two recessed assembly portions 111 respectively located on two opposite lateral sides thereof, and a plurality of fixing grooves 1111 located on each of the recessed assembly portions 111. The baffle 12 is provided with a plurality of through holes 1220 at the two side panels 122 corresponding to the fixing grooves 1111. A plurality of fasteners 3 composed of screws are inserted into the through holes 1220 and locked into the fixing grooves 1111 to form a fixing structure of the holder body 11 and the baffle 12. The aforementioned fixing structure of the holder body 11 and the baffle 12 is only one of many embodiments, and the holder body 11 and the baffle 12 can also be fixed by a buckle and buckle groove structure or by direct tight engagement. Therefore, the present invention is not limited to the fixing structure disclosed in the drawings, and it is hereby stated.

The outer diameter of the base 211 of the connector 21 is larger than the docking portion 212 and the positioning portion 213. The outer side of the docking portion 212 of the connector 21 has at least one flat and cut operating surface 2121 for disassembly and assembly by a preset hand tool.

The operating surface 2121 can be used for disassembly and assembly of the connector 21 by a hand tool with a hexagonal socket or other hand tools. The inner wall of the docking portion 212 has an internal thread (not shown) for the preset inter-matching connector to be screwed in and fixed. The positioning portion 213 of the connector 21 has an annular groove 2131 at the end thereof extending out of the housing 1, and the inner wall of the positioning portion 213 has an internal thread (not shown) for another preset inter-matching connector (not shown) to be screwed in and fixed. A stopper 4 is set in the annular groove 2131, and the stopper 4 is composed of a C-shaped buckle ring or a gasket. The stopper 4 can be used to prevent the connector 21 from excessively moving toward the opening 101 at the front side of the housing 1, so as to ensure that the floating connector can operate correctly.

When assembling the floating connector of the present invention, firstly, the docking portion 212 of the connector 21 is aligned with and inserted into the opening 101 of the holder body 11 and then the elastic member 22 is mounted around the positioning portion 213 of the connector 21. Next, the two side panels 122 of the baffle 12 are abutted against the recessed assembly portions 111 of the holder body 11. The holder body 11 and the baffle 12 are fixed by inserting the plurality of fasteners 3 composed of screws into the plurality of through holes 1220 and locking into the plurality of fixing grooves 1111. At this time, the docking portion 212 and the positioning portion 213 of the connector 21 are exposed outside the housing 1. Finally, the stopper 4 composed of a C-shaped buckle ring or a gasket is assembled at the annular groove 2131 of the positioning portion 213, and the assembly of the floating connector is completed by the above.

Figure 6:
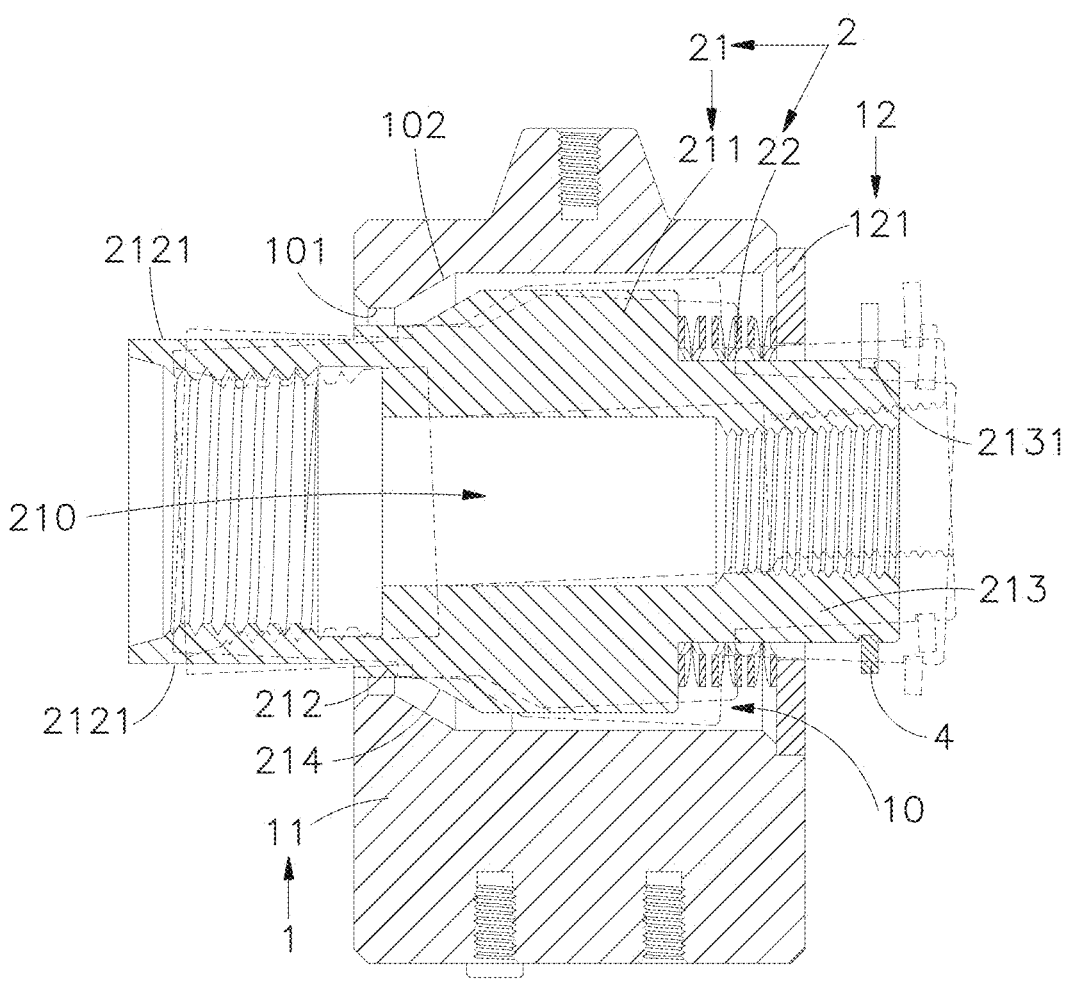
FIG. 6 is a side cross-sectional view of the floating connector of the present invention when the elastic member is compressed.

The main feature of the present invention is that when the floating connector is actually operated, when the preset inter-matching connector is connected to the connector 21, the connector 21 is pushed toward the perforation 120 at the rear side by the stress to compress the elastic member 22, the inclined ring portion 214 and the inclined inner wall 102 are in a non-contact state, and the docking portion 212 of the connector 21 has a ring-shaped offset when engaged with the preset inter-matching connector and has a deflection correction function (as shown in FIG. 6), so that if a small size tolerance problem occurs when the preset inter-matching connector is connected to the connector 21 of the floating module 2, the connector 21 of the floating module 2 can still be connected at a slightly tilted angle. When the preset inter-matching connector and the connector 21 of the floating module 2 are engaged and positioned, the connector 21 is pushed toward the opening 101 at the front side of the housing 1 by the elastic member 22 and the elastic member 22 is stretched, and the inclined ring portion 214 and the inclined inner wall 102 are re-formed into a supporting state, so the tightness between the preset inter-matching connector and the connector 21 of the floating module 2 is ensured, and no shaking or water coolant leakage occurs. Since the components of the floating connector are extremely simple, it has the effect of effectively reducing the overall size, which is conducive to the layout of electronic devices in limited internal space.

The above description is merely a preferred embodiment of the present invention and does not limit the patent scope of the present invention. Therefore, all simple modifications and equivalent structural changes made by using the contents of the description and drawings of the present invention should be included in the patent scope of the present invention and should be declared.

In summary, the floating connector for liquid cooling device of the present invention can achieve its effect and purpose when used. Therefore, this invention is truly an invention with excellent practicality. In order to meet the application requirements for invention patents, an application has been filed in accordance with the law. I hope that the review committee will approve this case as soon as possible to protect the inventor's hard work. If the review committee has any questions, please feel free to write to us for instructions. The inventor will do his best to cooperate and we will be very grateful.

What the invention claimed is:

1. A floating connector for liquid cooling device, comprising:

a housing comprising an accommodating and adjusting space therein, an opening formed at a front side of said accommodating and adjusting space, a perforation formed at an opposing rear side of said accommodating and adjusting space, and an inclined inner wall formed in said accommodating and adjusting space adjacent to said opening; and a floating module disposed in said accommodating and adjusting space, said floating module comprising a connector and an elastic member, said connector comprising a base located in the middle, a docking portion formed at a front end of said base and positioned in said opening, a positioning portion formed at an opposing rear end of said base and positioned in said perforation, a liquid flow channel extending through said docking portion, said base and said positioning portion, and an inclined ring portion formed between said base and said docking portion around said liquid flow channel, said elastic member with two ends thereof respectively abutting against said base and said housing being mounted around said positioning portion, so that when said elastic member is in an extended state, said inclined ring portion is supported against said inclined inner wall, and when said connector is pushed toward said perforation at the rear side of said accommodating and adjusting space to compress said elastic member, said inclined ring portion and said inclined inner wall are in a non-contact state, and said docking portion of said connector has a ring-shaped offset when engaged with a preset inter-matching connector and has a skew correction function, wherein said positioning portion of said connector comprises an annular groove at the end thereof extending out of said housing, and an internal thread located on an inner wall thereof for another preset inter-matching connector to be screwed in and fixed.

2. The floating connector for liquid cooling device as claimed in claim 1, wherein said housing is composed of a holder body and a baffle that are combined with each other, said holder body having said accommodating and adjusting space, said opening and said inclined inner wall therein, said baffle comprising a main body with said perforation disposed therein and two side panels respectively bent from two sides of said main body toward the same side.

3. The floating connector for liquid cooling device as claimed in claim 2, wherein said holder body comprises two recessed assembly portions respectively located on two opposite lateral sides thereof, and a plurality of fixing grooves located on each of said recessed assembly portions; said baffle is provided with a plurality of through holes at said two side panels corresponding to said fixing grooves and a plurality of fasteners composed of screws inserted into said through holes and locked into said fixing grooves to form a fixing structure of said holder body and said baffle.

4. The floating connector for liquid cooling device as claimed in claim 1, wherein said docking portion of said connector comprises at least one flat and cut operating surface located on an outer side thereof for disassembly and assembly by a preset hand tool, and an internal thread located on an inner wall thereof for the preset inter-matching connector to be screwed in and fixed.

5. The floating connector for liquid cooling device as claimed in claim 1, wherein said positioning portion further comprises a stopper set in said annular groove, and said stopper is selectively composed of a C-shaped buckle ring or a gasket.

6. The floating connector for liquid cooling device as claimed in claim 1, wherein said base of said connector has an outer diameter larger than said docking portion and said positioning portion.

7. The floating connector for liquid cooling device as claimed in claim 1, wherein said elastic member is composed of a flat spring with undulating winding.

8. A floating connector for liquid cooling device, comprising:

a housing comprising an accommodating and adjusting space therein, an opening formed at a front side of said accommodating and adjusting space, and a perforation formed at an opposing rear side of said accommodating and adjusting space; and a floating module disposed in said accommodating and adjusting space, said floating module comprising a connector and an elastic member, said connector comprising a base located in the middle, a docking portion formed at a front end of said base and positioned in said opening, a positioning portion formed at an opposing rear end of said base and positioned in said perforation, a liquid flow channel extending through said docking portion, said base and said positioning portion, and a stopper set at an end of said positioning portion extending out of said housing, said elastic member with two ends thereof respectively abutting against said base and said housing being mounted around said positioning portion, so that said docking portion of said connector has a ring-shaped offset when engaged with a preset inter-matching connector and has a skew correction function, wherein said positioning portion of said connector is provided with an annular groove disposed at the end thereof extending out of said housing, and said stopper is set in said annular groove, said stopper being selectively composed of a C-shaped buckle ring or a gasket.

9. The floating connector for liquid cooling device as claimed in claim 8, wherein said elastic member is composed of a flat spring with undulating winding.

* * * * *